United States Patent
Lin

(10) Patent No.: US 7,036,403 B2
(45) Date of Patent: May 2, 2006

(54) ARTICULATED WRENCH

(75) Inventor: Yu-Cheng Lin, Taichung (TW)

(73) Assignee: Lea Way Hand Tool Corporation, Taichung (TW)

( * ) Notice: Subject to any disclaimer, the term of this patent is extended or adjusted under 35 U.S.C. 154(b) by 0 days.

(21) Appl. No.: 10/440,915

(22) Filed: May 19, 2003

(65) Prior Publication Data

US 2004/0231472 A1 Nov. 25, 2004

(51) Int. Cl.
*B25B 23/16* (2006.01)
(52) U.S. Cl. ...................................... 81/177.8
(58) Field of Classification Search ............... 81/177.7, 81/177.8, 60; 403/120, 146; 411/402
See application file for complete search history.

(56) References Cited

U.S. PATENT DOCUMENTS

| 2,344,808 | A | * | 3/1944 | Duffield et al. | ............. | 403/146 |
| 2,631,488 | A | * | 3/1953 | Tansey | ........................ | 411/402 |
| 4,752,178 | A | | 6/1988 | Greenhill | | |
| 4,932,807 | A | | 6/1990 | Rhodes | | |

(Continued)

FOREIGN PATENT DOCUMENTS

| CA | 2 330 264 | 7/2002 |
| CN | 2094423 U | 1/1992 |
| DE | 2 231 385 | 1/1974 |
| DE | 299 20 660 | 3/2000 |
| DE | 299 20 660 U 1 | 9/2000 |
| TW | 6824696 | 9/1980 |
| TW | 85201726 | 1/1985 |
| TW | 86215851 | 9/1986 |
| TW | 78208203 | 7/1990 |
| TW | 82202299 | 5/1994 |
| TW | 85106361 | 3/1997 |
| TW | 87215582 | 8/1999 |
| TW | 88218237 | 6/2001 |
| TW | 89221170 | 8/2001 |
| TW | 90210257 | 9/2002 |

OTHER PUBLICATIONS

"Mechanical Design Handbook", ver. 11, pp. 11a-16, 11a-17, 12-8 and 12-9.
:Web pages of Wilin's tEchnology Industrial Co., Ltd. "DIN 137 A/B 7.020 Lock washer, and Spring Washer Curved of Bossard 2002 Catalog", pp. 7.000 and 7.020.
"Mechanical Design Handbook", ver. 11, pp. 11a-16, 11a-17, 12-8 and 12-9.
Web pages of Wilin's tEchnology Industrial Co., Ltd. "DIN 137 A/B 7.020 Lock washer, and Spring Washer Curved of Bossard 2002 Catalog", pp. 7.000 and 7.020.

*Primary Examiner*—Lee D. Wilson
(74) *Attorney, Agent, or Firm*—Ladas and Parry LLP

(57) ABSTRACT

This invention provides an articulated wrench, comprising: a box end; a handle; a fastening device passing through the through holes of the box end and handle; and a flexed spring disc. The fastening device has a head and a shank, wherein the head gradually expands outwards from the shank to form a flared angle having a tapering angle less than 45°. The flexed spring disc is provided in the indent of the box end and flexed along a diameter thereof to form a curvature.

7 Claims, 7 Drawing Sheets

U.S. PATENT DOCUMENTS

| | | | | |
|---|---|---|---|---|
| 5,082,387 A | * | 1/1992 | DeVries | 403/146 |
| 5,199,335 A | | 4/1993 | Arnold et al. | |
| 5,230,263 A | * | 7/1993 | Kwaka | 81/177.7 |
| 5,320,443 A | | 6/1994 | Lien et al. | |
| 6,216,565 B1 | | 4/2001 | McCann | |
| 6,216,567 B1 | * | 4/2001 | Hu | 81/177.7 |
| 6,241,731 B1 | | 6/2001 | Fiz | |
| 6,295,898 B1 | * | 10/2001 | Hsieh | 81/177.8 |
| 6,412,374 B1 | * | 7/2002 | Hsieh | 81/177.7 |
| 2003/0015070 A1 | | 1/2003 | Chen | |

* cited by examiner

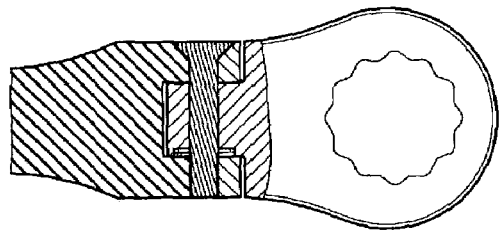
FIG. 6(a)
(PRIOR ART)
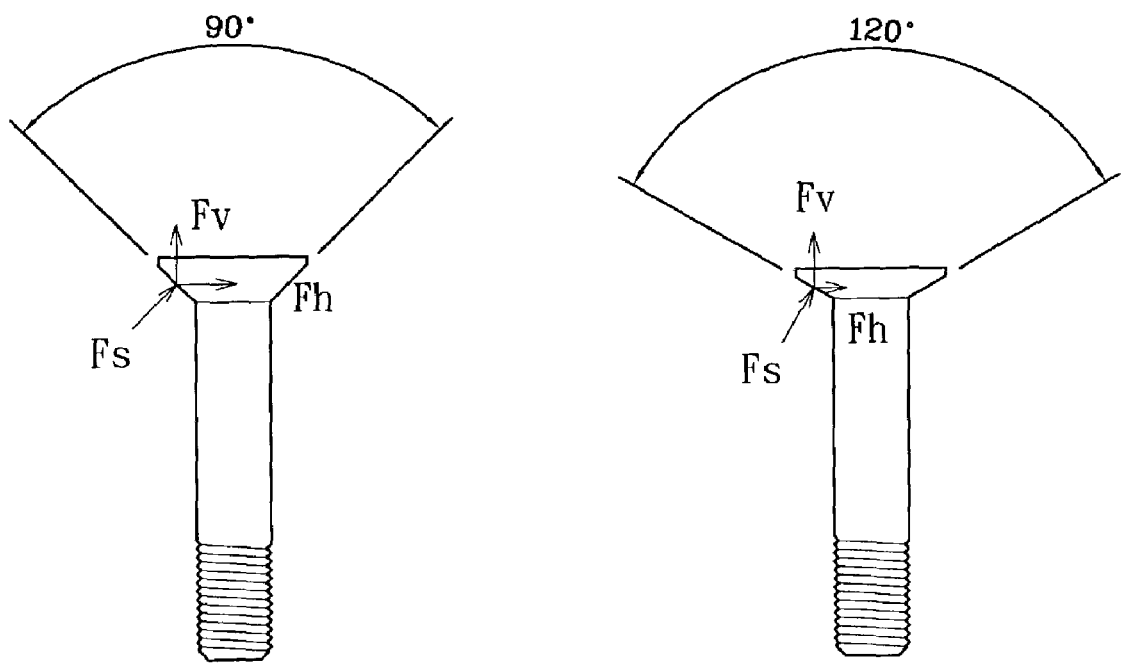
FIG. 6(b)
(PRIOR ART)
FIG. 6(c)
(PRIOR ART)

ARTICULATED WRENCH

CROSS-REFERENCES TO RELATED APPLICATIONS

Not Applicable

STATEMENT REGARDING FEDERALLY SPONSORED RESEARCH OR DEVELOPMENT

Not Applicable

1. Field of Invention

This invention is related to an articulated wrench, particularly to one implementing an improved head and a flexed spring disc.

2. Background of Invention

As shown in FIGS. 5 and 6, conventional articulated wrenches mostly adopt a flat head screw or an oval head screw as well as a spring or a spring washer to construct the wrench joint to allow pivotal connection between a box end and a handle of the wrench.

However, in operating such conventional articulated wrenches that implement the flat head screw, the screw head only sustains a vertical force component (Fv) without any horizontal force component (see FIGS. 5(a) and 5(b). For conventional articulated wrenches that implement the oval head screw, the vertical force component (Fv) sustained by the screw head is greater than the horizontal force component (Fh) (see FIGS. 6(a) and 6(b)). When the screw is subjected to forces, because most of the force is applied towards a top of the screw head, the screw head may be easily fractured.

To improve strength of the screw, most designers increase the screw sizes. However, the increment in the screw sizes results in enlargement of the cavity formed on the wrench body for receiving the screw, and thus reduces wall thickness of the wrench boy, thereby reducing the wrench strength. To improve the strength of the wrench, designers further increase the wall thickness of the wrench body. However, the increment in the wall thickness results in increment in the overall thickness of the wrench, thereby reducing the flexibility and mobility of the wrench, or causing operation failure in a compact space.

At the same time, to prevent the box end of the wrench from swinging about the handle, prior art mounts a spring (FIG. 7(a)) or a spring washer (FIG. 7(b)) at the joint of the articulated wrench, where the frictional force generated by resilience of such components between the box end and the handle serves as a retaining force that prevents swinging of the box end. However, elastic fatigue due to prolonged usage may cause reduction in the retaining force.

To eliminate such problems, the known measure of increasing the spring sizes results in enlargement of the indent formed on the box end of the wrench body for receiving the spring, and thus reduces the strength of the box end and causes difficulty in assembly. Furthermore, the excessive resilience of the increase spring size may also cause difficulty and inconvenience in rotating the box end in the early stage of the application of the articulated wrench.

SUMMARY OF INVENTION

It is an objective of this invention to provide an articulated wrench implementing an improved head that does not need to enlarge the cavity for receiving the fastening device such that the horizontal force component sustained by the head is greater than the vertical force component.

It is another objective of this invention to provide an articulated wrench implementing a flexed spring disc that does not need to enlarge the indent fro receiving the spring disc that guarantees lasting resilience and eliminates elastic fatigue.

To achieve the above objectives, this invention provides an articulated wrench, comprising: a box end, formed with a cavity thereon for receiving a ratchet ring, having an end formed with at least one box knuckle, the box knuckle being formed on a side thereof with an indent and a through hole penetrating the box knuckle sideway; a handle, having an end formed with at least one handle knuckle accommodating the box knuckle of the box end, each handle knuckle being formed with a through hole penetrating the handle knuckle sideway; a fastening device, inserted through the through holes of the box end and the handle, having a head and a shank, wherein the head gradually expands outwards from the shank to form a flared angle having a tapering angle less than 45°; and an elastic device, provided in the indent of the box end.

This invention provides an alternative articulated wrench, comprising: a box end, formed with a cavity thereon for receiving a ratchet ring, having an end formed with at least one box knuckle, the box knuckle being formed on a side thereof with an indent and a through hole penetrating the box knuckle sideway; a handle, having an end formed with at least one handle knuckle accommodating the box knuckle of the box end, each handle knuckle being formed with a through hole penetrating the handle knuckle sideway; a fastening device, inserted through the through holes of the box end and the handle, having a head and a shank, wherein the head gradually expands outwards from the shank to form a flared angle having a tapering angle less than 45°; and an elastic device, provided in the indent of the box end.

The structures and characteristics of this invention can be realized by referring to the appended drawings and explanations of the preferred embodiments.

BRIEF DESCRIPTION OF DRAWINGS

FIGS. 6(a), 6(b) and 6(c) illustrate the force components experience by an oval head screw implemented in a conventional articulated wrench.

DETAILED DESCRIPTIONS OF EMBODIMENTS

Figure 1:
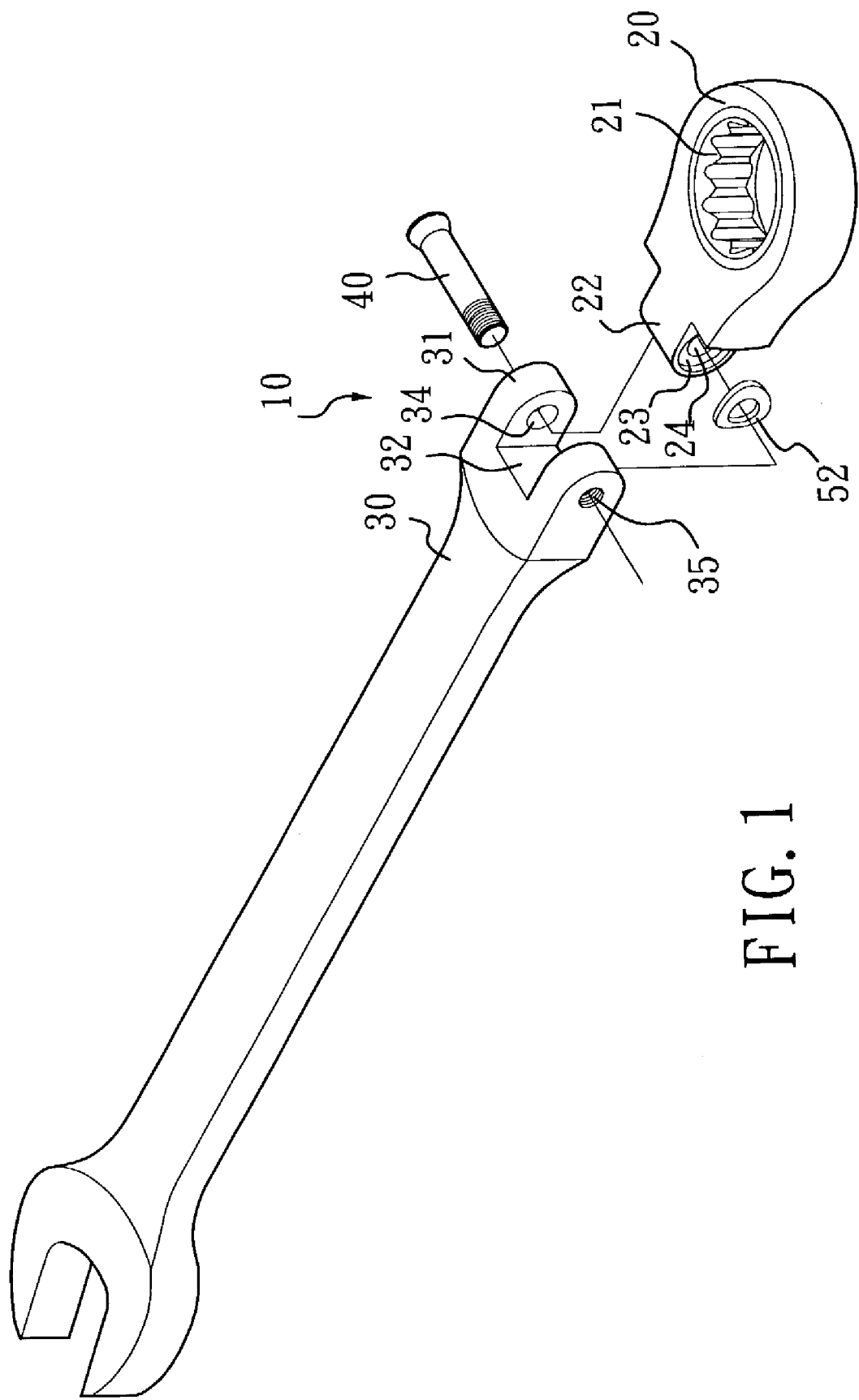
FIG. 1 illustrates an exploded view of an articulated wrench of this invention.
Figure 2:
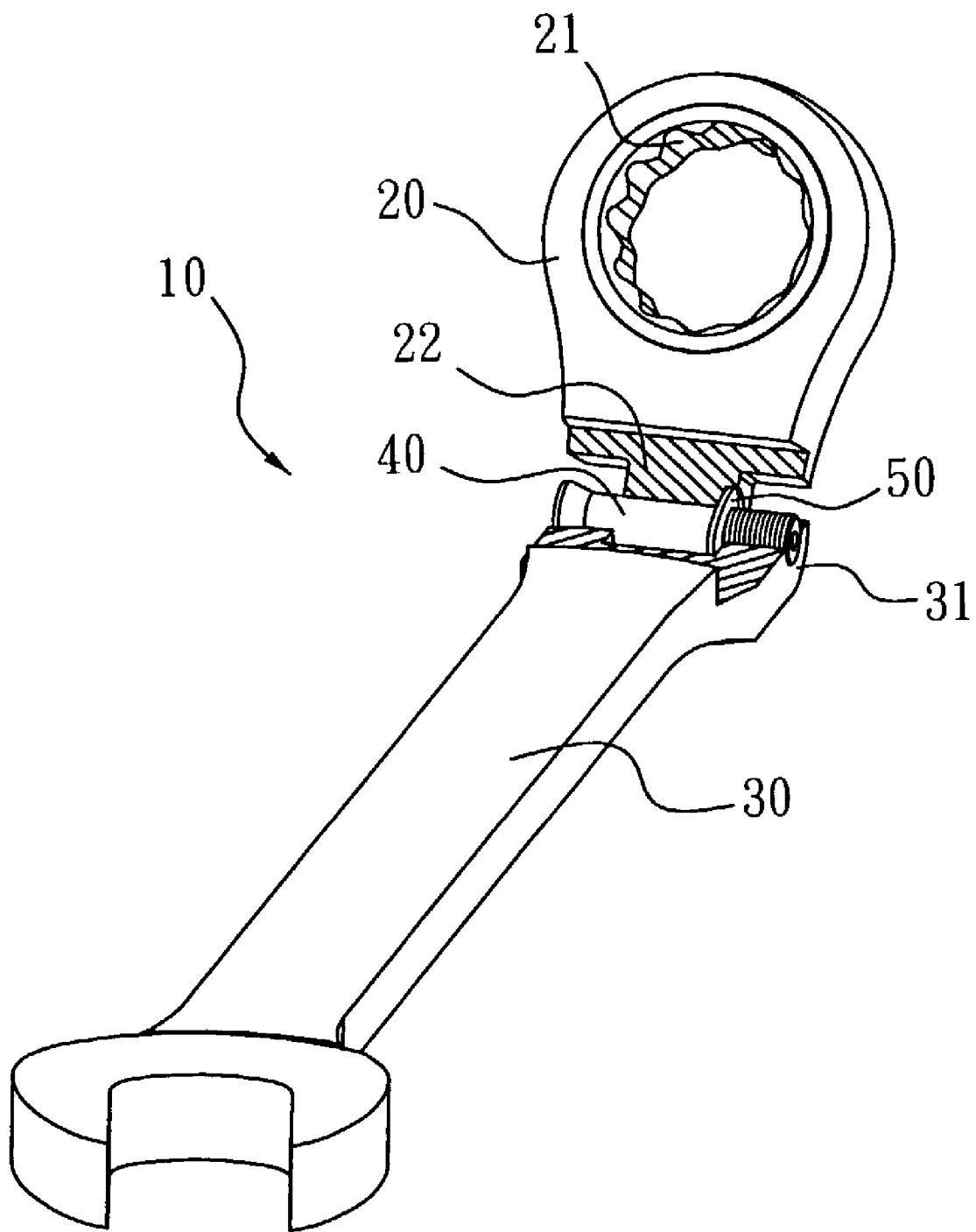
FIG. 2 illustrates an assembled view of an articulated wrench of this invention, where part of the joint is removed to clearly illustrate the features of this invention.

FIG. 1 illustrates an exploded view of an articulated wrench 10 of this invention. FIG. 2 illustrates an assembled view of the articulated wrench 10 of this invention, where part of the joint is removed.

The articulated wrench 10 of this invention comprises: a box end 20, a handle 30, a fastening device (a screw 40 in this invention) and a flexed spring disc.

The box end 20 includes two major surfaces and a peripheral surface defined between the two major surfaces. The handle 30 is of a flat, elongated configuration and includes two major surfaces and a peripheral surface defined between the two major surfaces.

The box end 20 is formed thereon with an opening penetrating the two major surfaces of the box end 20 for receiving a ratchet ring 21. The box end 20 is formed at an end thereof with at least one box knuckle 22. The box knuckle 22 is formed with an indent 23 at a side thereof and a through hole 24 penetrating the box knuckle 22 sideway and being substantially to the major surfaces of the box end 20.

The handle 30 is formed at an end thereof with at least one handle knuckle 31 accommodating the box knuckle 22 of the box end 20. According to this invention, the box end 20 includes one box knuckle 22 and the handle 30 includes two handle knuckles 31 that adapt to locate at opposing ends of the box knuckle 22 of the box end 20. Persons skilled in the art may easily modify the number of the box knuckle 22 and handle knuckle 31 provided to the box end 20 and handle 30, respectively.

Each handle knuckle 31 includes a through hole 34. The through holes 34 pass through and penetrate the handle knuckles 31 sideway, and are substantially parallel to the major surfaces of the handle 30. The through holes 34 each include an axial line that aligns with one another. One of the through holes 34 is formed therein with inner threads 35.

Figure 3A:
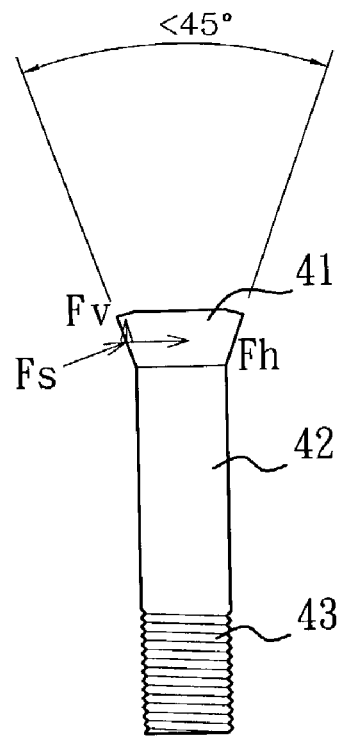
FIG. 3(a) illustrates a top plan view of the screw implemented by the articulated wrench of this invention and the force components experienced by the screw.

FIG. 3(a) illustrates a top plan view of the screw 40. The screw 40 is inserted through the through holes 24, 34 formed in the box knuckle 22 and handle knuckle 31 of the box end 20 and the handle 30, respectively.

The screw 40 includes a head 41 and a shank 42. The shank 42 is formed at a tail end thereof with outer threads 43 adapted to the inner threads 35 of the handle knuckle 31.

Figure 3B:
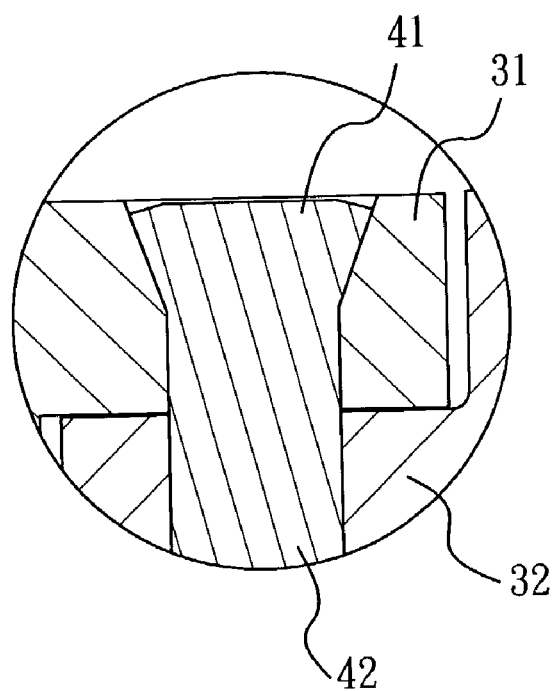
FIG. 3(b) is an enlarged cross-sectional view illustrating the screw after assembly.

The head 41 gradually expands outwards from the shank 42 to form a flared angle having a tapering angle less than 45°. FIG. 3(b) is an enlarged cross-sectional view illustrating the screw 40 after being assembled to the box knuckle 22 and handle knuckle 31 of the box end 20 and handle 30.

Other fastening devices, such as rivets or screw rods, may also be implemented to insert through the box knuckle 22 and handle knuckle 31 to obtain the same result.

Figure 4A:
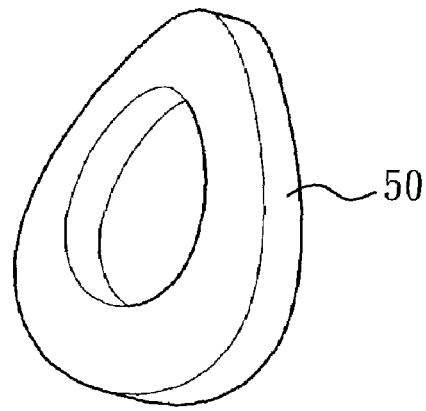
FIG. 4(a) is a perspective view of a flexed spring disc implemented by the articulated wrench of this invention.

FIG. 4(a) is a perspective view of the flexed spring disc 50.

The flexed spring 50 is formed by flexing a flat spring disc along its diameter at a fixed angle through stamping process such that a curvature is formed along a flexed location. The preferred material for forming the flexed spring 50 is SK5 carbon steel sheet.

Preferably, the curvature has a curving radius in the range of about 4.0 mm~30.0 mm. The flexed spring disc 50 has a total height H and a net thickness T under a free state and prior to assembly (see FIG. 4(b)). The relationship between the total height H and the net thickness T is defined to be:

$$H = 1.2T \neq 2.5T$$

The so-called total height H refers to the height of the flexed spring disc 50 after flexing while the net thickness T is the actual thickness of the flexed spring disc 50.

Figure 4B:
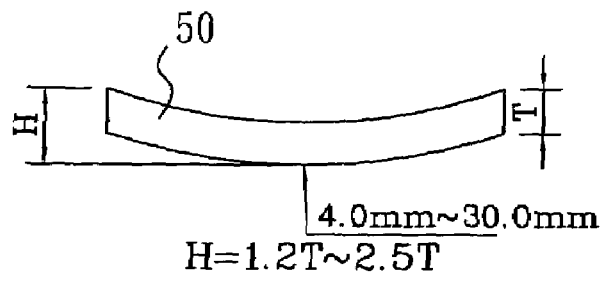
FIG. 4(b) illustrates the flexed spring disc of FIG. 4(a) under a free state and prior to assembly.
Figure 4C:
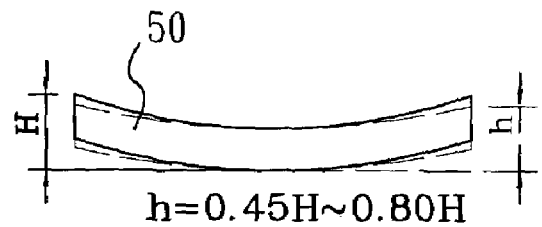
FIG. 4(c) illustrates the flexed spring disc of FIG. 4(c) under a compressed state after assembly.
Figure 4D:
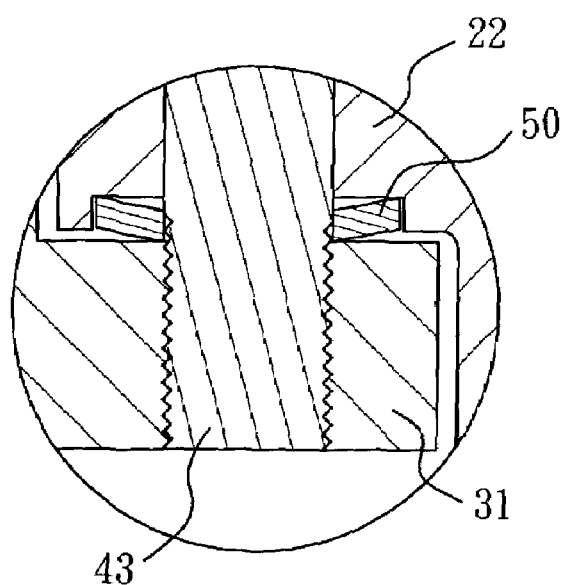
FIG. 4(d) is an enlarged cross-sectional view illustrating the flexed spring of FIG. 4(a) after assembly.
Figure 5A:
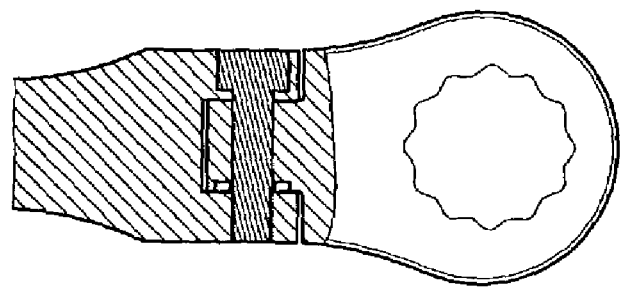
FIGS. 5(a) and 5(b) illustrate the force components experience by a flat head screw implemented in a conventional articulated wrench.
Figure 5B:
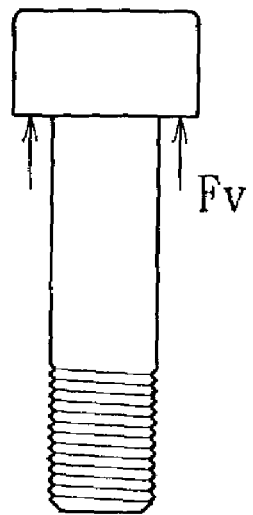

FIG. 4(d) is an enlarged cross-sectional view illustrating the flexed spring 50 after assembly. After assembling the flexed spring disc 50 between the indent 23 of the box end 20 and a handle knuckle 31 of the handle 30, the total height of the flexed spring 50 is compressed to h. The relationship between the total height H and the compressed total height h is defined to be:

$$h = 0.40H \neq 0.80H$$

With reference to FIG. 3(a), according to this invention, due to the small tapering angle of the head 41, the size of the head 41 may be significantly reduced so as to reduce the size of the through hole 34 formed in the handle knuckle 31 of the handle 30 for receiving the head 41, whereby wall thickness and the strength of the handle knuckle 31 are increased. When being subjected to a force Fs, due the small tapering angle of the head 41, the horizontal force component Fh of the force Fs is much greater than the vertical force component of the force Fs such that most of the force is applied towards the screw center but not top of the head 41. As such, fracturing of the head 41 due to excessive forces is eliminated without the need to increase the wall thickness of the handle knuckle 31 of the handle 30. The significant reduction of the head 41 also helps to increase the shank 42 dimension such that the number of the threads 43 formed on the shank 42 may be increased so as to increase the strength of the shank 42 for resisting tension.

Figure 7A:
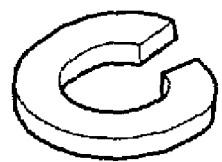
FIGS. 7(a) and 7(b), respectively, illustrate the spring and spring washer implemented in a conventional articulated wrench.
Figure 7B:
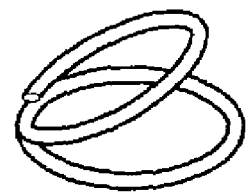

With reference to FIGS. 4(b) and 4(c), because the flexed spring disc 50 is flexed along its diameter, contact between the flexed spring disc 50 and the handle knuckle 31 of the handle is increased and forces applied to the flexed spring disc 50 may be evenly distributed. At the same time, as compared to the conventional spring or spring washer (FIGS. 7(a) and 7(b)), compression ratio of the flexed spring disc 50 after assembly is small such that the resilience of the flexed spring disc 50 may last while eliminating elastic fatigue.

On the other hand, because no notch is formed on the flexed spring disc 50, rotation of the box end 20 with respect to the handle 30 can be operated in a smooth manner without and clicking or jagging.

This invention is related to a novel creation that makes a breakthrough in the art. Aforementioned explanations, however, are directed to the description of preferred embodiments according to this invention. Various changes and implementations can be made by persons skilled in the art without departing from the technical concept of this invention. Since this invention is not limited to the specific details described in connection with the preferred embodiments, changes to certain features of the preferred embodiments without altering the overall basic function of the invention are contemplated within the scope of the appended claims.

LISTING OF NOMENCLATURES

| 10 | articulated wrench | 20 | box end |
|---|---|---|---|
| 21 | wretch ring | 22 | box knuckle |
| 23 | indent | 24 | through hole |
| 30 | handle | 31 | handle knuckle |
| 34 | through hole | 35 | inner threads |
| 40 | screw | 41 | head |
| 42 | shank | 43 | outer threads |
| 50 | flexed spring disc | H | total height |

-continued

LISTING OF NOMENCLATURES

| T | net thickness | h | compressed height |
| Fh | horizontal force component | Fv | vertical force component |

What is claimed is:

1. In an articulated wrench having:
a box end, formed with a cavity thereon for receiving a ratchet ring, having an end formed with at least one box knuckle, the box knuckle being formed on a side thereof with an indent and a through hole penetrating the box knuckle sideway; and
a handle, having an end formed with at least one handle knuckle accommodating the box knuckle of the box end, each handle knuckle being formed with a though hole penetrating the handle knuckle sideway;
the improvements comprising a fastening device, inserted through the through holes of the box end and the handle, having a head and a shank, wherein the head gradually expands outwards from the shank to form a flared angle having a tapering angle less than 45°; and
a flexed spring disc, provided in the indent of the box end and flexed along a diameter thereof to form a curvature.

2. The articulated wrench of claim 1, wherein one of handle knuckles of the handle is formed with inner threads and wherein the fastening device is a screw, the shank of the screw being formed with outer threads at a tail thereof for engaging the inner threads.

3. The articulated wrench of claim 1, wherein the curvature of the flexed spring disc has a curving radius in the range of about 4.0 mm~30.0 mm.

4. The articulated wrench of claim 1, wherein the flexed spring disc has a total height H and a net thickness T under a free state and prior to assembly, and wherein H 1.2 T~2.5 T.

5. The articulated wrench of claim 4, wherein the total height of the flexed spring is compressed to a compressed height h after assembly, and wherein h=0.40 H~0.80 H.

6. The articulated wrench of claim 1, wherein the box end includes one box knuckle and the handle includes two handle knuckles that adapt to locate at opposing ends of the box knuckle.

7. The articulated wrench of claim 6, wherein the through holes of the handle knuckles each include an axial line that aligns with one another.

\* \* \* \* \*